Sept. 11, 1962 C. S. JONES 3,054,100

SIGNALLING SYSTEM

Filed June 4, 1958 2 Sheets-Sheet 1

CLARENCE S. JONES
INVENTOR
BY Harvey G. Lowhurst
ATTORNEY

CLARENCE S. JONES
INVENTOR

BY Harvey J. Lowhurst
ATTORNEY

United States Patent Office 3,054,100

Patented Sept. 11, 1962

3,054,100
SIGNALLING SYSTEM

Clarence S. Jones, Los Altos, Calif., assignor to General Precision, Inc., a corporation of Delaware Filed June 4, 1958, Ser. No. 739,909
26 Claims. (Cl. 343—6.5)

Figure 1:
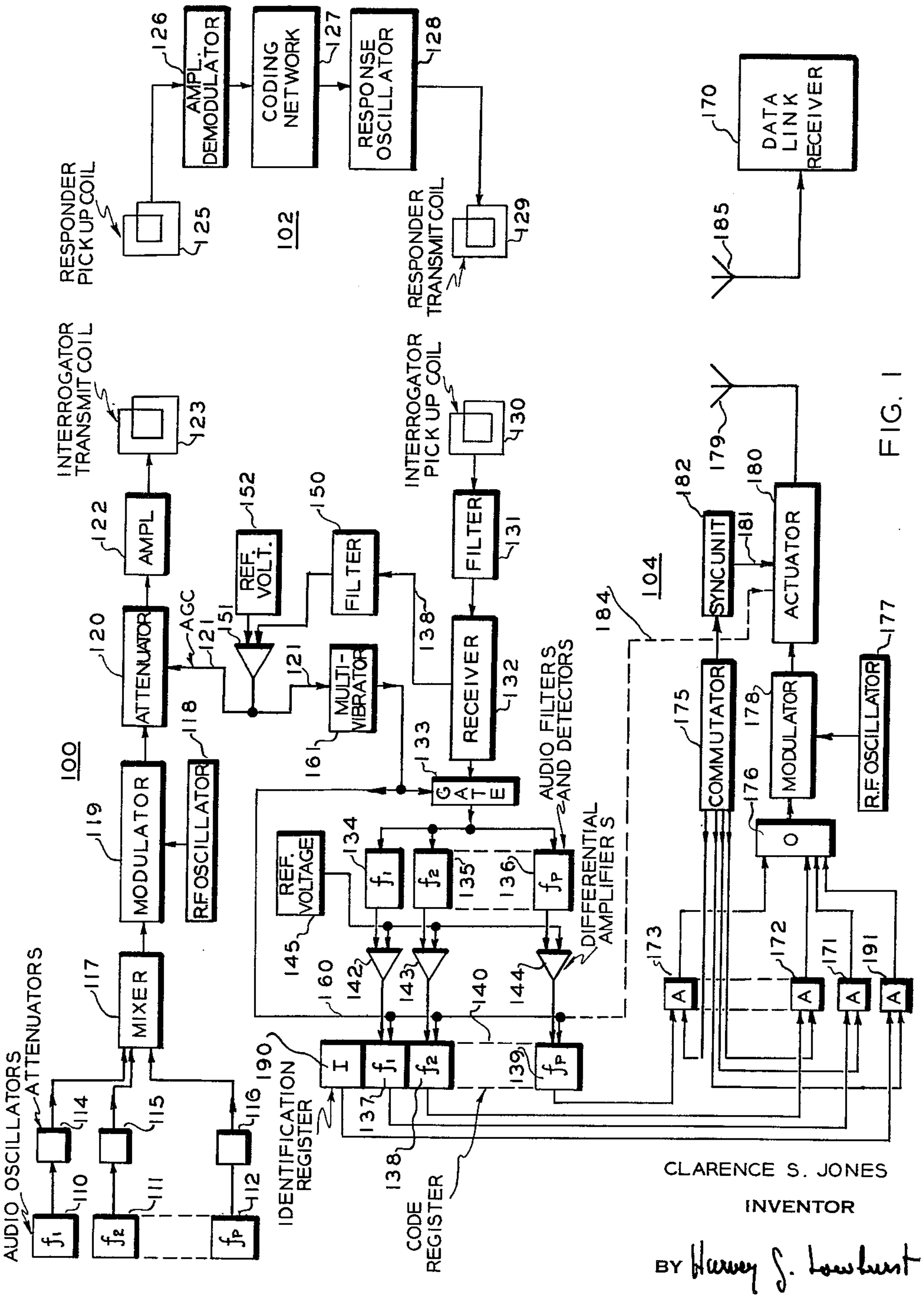

This invention relates to electrical signalling systems, and more particularly to apparatus for identifying the location of a first object with respect to one or more of a plurality of second objects. The invention may be utilized for a variety of different purposes, a number of which will be mentioned below.

In the transportation and materials handling fields in general, and particularly in the efficient running of a railroad, it often becomes desirable to know such information as where each train is at any time, or with what velocity the train is moving, or where individual railroad cars are located. Sometimes it is of great advantage to determine the location of goods or materials carried on railroads, trucks or conveyers.

A considerable saving may often be effected if a central agency is apprised, at all times, of selected portions of the above information, since the operation of railroad or trucking business involves long distances covering a large territory without readily available communication equipment. For example, scheduling of trains may be considerably simplified by remotely observing the density of traffic at crowded switching points. Information as to the location and identity of available railroad vehicles stored on sidings is immensely useful in determining the type and amount of freight space available at any of the loading centers. Information as to the location of particular goods, such as raw materials or cattle shipped across country on several trains or trucks, helps the recipient to make necessary arrangements for unloading, storing or the like.

Referring now more specifically to the railroad business, it has heretofore been suggested that radio links be established between each engine or each train and a central agency in order that the operators, or the attendant personnel thereof, be able to inform the central agency of their location. While such systems have been quite useful, their effectiveness has been limited by the fact that each train operator must be relied upon always to furnish accurate information with regard to the location of his train. Additionally, the location of selected special purpose equipment, such as refrigerator cars or heavy-duty freight cars, may require further radio links situated proximate to such coupling points to be operated by railroad yard personnel, since the train operator usually does not have the means or responsibility to ascertain or keep track of the identity of the individual cars on his train.

The need for an automatic signalling system for furnishing accurate information with regard to train or truck location or goods identification to a central agency has long been recognized, and various systems have been proposed. As far as I know, none have been very successful, except the system disclosed in my copending application Serial Number 715,899, filed February 18, 1958, for "Signalling System," which application is assigned to the same assignee as the present invention.

The specific system disclosed in detail in my copending application may be said to comprise an interrogator-responder system, utilizing an interrogator apparatus to apply radio frequency energy to a transmit coil carried on a movable device, such as a railroad vehicle. In my previous application, successive bursts of radio frequency energy are transmitted on different frequencies, which are cyclicly repeated. As the vehicle carrying the transmit coil moves sufficiently close to any one of a plurality of passive response blocks distributed along the right-of-way, certain of the radio frequency bursts operate resonant circuits within the response block to furnish power to operate a small responder oscillator, which transmits a return signal on a further radio frequency. By selective use of differently tuned circuits in different response blocks, the responder oscillator will provide a serial pulse code signal for reception by a receiver associated with the interrogator useful for identifying each response block. As well as using the interrogator on a vehicle to determine vehicle position with respect to a plurality of fixed locations, my previous system contemplates locating the interrogator at a fixed location to identify objects passing by which are provided with suitable passive response blocks and which pass within the signal field of the interrogator.

My previously disclosed basic system offers an extreme advantage over prior systems in that it uses purely passive automatic response block units without being inaccurate or unreliable, so that numerous remote stations or locations may be provided with response means without attendant provision of electric batteries or wired power sources. While passive response units have heretofore been provided elsewhere, all of these of which I am aware required precise physical alignment and were adversely affected by various environmental factors.

While the invention of application Serial Number 715,899 admirably accomplishes its purposes, and while it is ideally suited for a wide variety of applications, certain applications benefit from modification of my earlier system. For example, the specific interrogator disclosed in detail in my earlier system transmits a series of radio frequency signal bursts, each of a different frequency, with a burst of radio frequency energy of a further frequency interposed between each code signal for automatic gain control purposes. If a large number of differently coded response blocks are to be used, so that the system may employ a digital code having a relatively large number of binary digits, a large number of different interrogator frequencies must be transmitted successively. This requirement may be troublesome when the system is applied to the identification of very rapidly moving objects, or the identification of the location of an object which moves rapidly with respect to a plurality of fixed locations.

In order to allow the use of economical circuitry and still preserve system reliability, the time length of each radio frequency signal burst must be maintained at or above a minimum value. In the case of rapidly moving bodies, the interrogator transmit coil and response pickup coil may remain sufficiently close to a response block to interrogate the block only during a short period of time, so that an insufficient number of interrogator frequencies can be transmitted if each frequency is allotted its required duration. The present invention is in some respects an improvement over the previous invention since it overcomes the described limitation by interrogating a plurality of digits simultaneously.

In certain other applications signalling systems of this nature may be used to transmit data relating to the position of a movable object with respect to successive fixed locations. Sometimes it is desirable to be able to determine the rate at which the object is moving by noting the rate at which it passes by a number of fixed stations. If a precise velocity determination is to be made at a given instant rather than a mere average velocity determination, it may be understood that vehicle location must be noted at different locations which are very close to each other. If response stations are located very close to each other, and if vehicle speeds become great enough, it is sometimes absolutely necessary that all identification digits be determined simultaneously.

It has been proposed to interrogate a plurality of binary digits of a responder simultaneously with radio frequency energy having a single frequency by providing each responder with a selected plurality of response oscillators, each one of which corresponds to one digit. In this manner, the interrogation time is a minimum, since only a single burst of radio frequency energy provides a digitally coded response signal identifying a responder uniquely. In such a system, the interrogator receiver means instead of the interrogator transmit means utilizes a broadly tuned coil which is responsive to the radiation from each one of the selected plurality of response oscillators. When this proposed system is compared to the system of my above mentioned copending application, it is seen that the burden of generating the plurality of code frequencies has been shifted from the interrogator unit to the response block, with simplification of the former but with more complex structure in the latter. In many applications of signalling apparatus of this nature, large numbers of response blocks are needed and only a few interrogator units are needed. In such instances it becomes uneconomical to increase the complexity of the response blocks.

My abovementioned copending application disclosed in detail an interrogator-responder system using signals of twelve different radio frequencies in order to provide identification by means of a digital code having ten digits. If the twelve frequencies are spaced so as not to interfere with each other and not to interfere with other radio signalling devices, it will be seen that they require a given amount of the R.F. spectrum. The present invention allows a great reduction in the required bandwidth. By using a single interrogator R.F. frequency and a single response R.F. frequency in the present invention, I am able to transmit a large amount of data using much less bandwidth. In my previous system my interrogator unit radiating means had to be broadly tuned, with attendant loss in selectivity, because it had to transmit numerous different radio frequencies. In a modiled version of my earlier invention, a plurality of R.F. response frequencies were required, so that my interrogator receiver input circuit had to be broadly tuned. The present invention allows both the radiating means and the receiver means to be sharply tuned, so that stronger signals may be transmitted and received without increasing the cost of my transmitter units, thereby increasing the signal-to-noise ratio and accuracy of my signalling system.

It is therefore one object of my invention to provide an improved signalling system for automatically identifying, locating and numbering a plurality of objects.

It is another object of my invention to provide an improved signalling system of the type in which a plurality of digits are interrogated simultaneously.

It is still another object of my invention to provide an improved signalling system for interrogating a plurality of digits simultaneously utilizing a simplified response block.

It is a further object of my invention to provide an improved signalling system wherein a simplified interrogator unit interrogates a response block with a burst of modulated radio frequency energy of a single frequency and wherein the response block responds thereto with a burst of radio frequency energy of a single frequency, in which the signal provided by the response block is capable of uniquely identifying one of a large number of response blocks.

It is a further object of my invention to provide an improved signalling system for interrogating a plurality of digits simultaneously wherein both the transmit coils and the pick-up coils may be sharply tuned so as to allow greater sensitivity and accuracy.

It is still a further object of my invention to provide an improved signalling system utilizing a simplified responder which does not require external power for its operation.

It is a still further object of my invention to provide an improved signalling system which is reliable in operation, simple in design and economical in construction.

Other objects of the invention will in part be obvious and will in part appear hereinafter.

In accordance with one embodiment of the invention, an interrogator unit, also called the interrogator, is mounted upon a moving vehicle whose location is to be determined at fixed intervals. The interrogator has a transmit channel which originates and radiates a radio frequency carrier signal having a plurality of audio frequency modulating signals modulated thereon. A number of response blocks, also referred to as responders, may be located at various intervals along a railroad track or roadbed over which the vehicle passes. In the case of railroad tracks, the preferred position of each responder is the top or inside of a selected track tie.

The location of and the distance between individual response blocks is largely a matter of choice determined by what particular points identification of location of the vehicle is made. As will be explained below, the number of response blocks which may be utilized throughout an entire railroad network are limited, at least to some extent, by the number of digits of the digital code used. As will become clearer from the detailed description of this invention, each of the audio frequency modulating signals provides one digit of a digitally coded identification number.

As stated above, the respective position of the interrogator and responders may be exchanged so that the interrogator unit is fixed and each of the moving vehicles carries a response block. Such an arrangement is preferred when goods are moved by conveyor or the like over or past the interrogator, or when freight cars are to be classified upon entering or leaving a switchyard.

When the interrogator is located near or directly above a response block, the pick-up coil of the responder receives the audio modulated interrogator carrier and demodulates the same to provide a response-actuating signal therefrom. This response-actuating signal may comprise a direct current power component attributable to the rectification of the radio frequency carrier and a composite audio frequency signal component attributable to the individual audio frequency interrogator signals which modulated the carrier. The response-actuating signal is applied to a responder coding means which passes or suppresses selected ones of the modulating signals. The output signal of the coding means provides a digitally coded response-actuating signal by virtue of the selected modulating signals remaining on the output signal. Each different responder is coded so that it passes or suppresses different ones of the modulating signals, so that the digital coding of each output response-actuating signal identifies a particular responder.

The digitally coded response-actuating signal is then utilized to power a response oscillator which provides a further radio frequency carrier having modulated thereon those of the audio frequency modulating signals passed by the coding means. The coded response-actuating signal is the sole power required to operate the response oscillator, so that no batteries or wired power sources are necessary.

The coded carrier radiated by the response oscillator couples electromagnetically to and is detected by a receive channel, which may be part of or physically located with the interrogator. In some applications, it may be considered advantageous to rectify the carrier to provide a voltage for automatic gain control of the transmit channel. The signal received and detected by the receive channel is applied to an audio frequency discriminator device which has a separate output channel for each audio frequency modulating signal provided in the interrogator transmit channel, each discriminator output channel being selectively responsive to a respective or individual one of the audio frequency interrogator signals. The decoded audio signal, which is a mixture of selected audio frequency interrogator signals, is thereby unscrambled or separated into individual audio frequency interrogator signals, and after suitable rectification, an output voltage appears on each channel associated with a selected audio frequency interrogator signal. The presence or absence of an output voltage on a channel may be indicated upon a code register as either a "one" or a "zero" for providing a digitally coded number which determines uniquely the particular response block being interrogated.

The digital code set into the code register may be transmitted to a central agency by any of the many well-known data link systems. Since the central agency in a railroad signalling system of the kind here described usually desires information from a large number of railroad trains, and since it might be uneconomical to provide separate data link receivers for each interrogator, it often will be convenient to add an identification register to the code register. An identification register may be provided with each interrogator, so that signals which identify the interrogator are sent to the central agency to specify which interrogator is "reporting" to the central agency. This addition increases the number of digits which must be transmitted by the data link system by the number of digits necessary to identify a particular interrogator unit. The additional register, however, does not complicate the interrogator, since it is not a part of the interrogator, and only comes into operation in connection with a data link system.

Figure 2A:
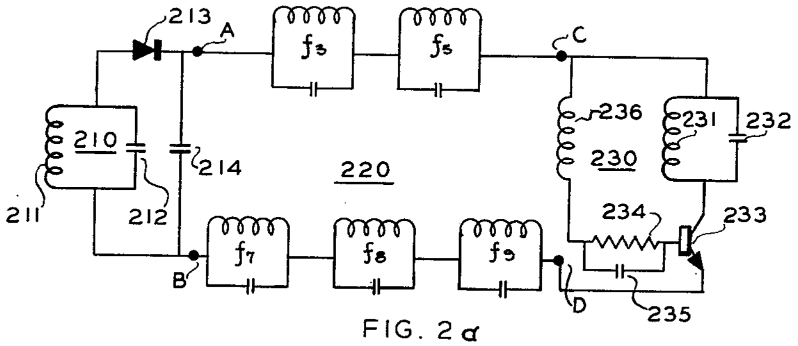
Figure 2B:
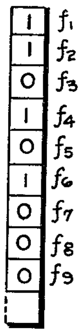
Figure 2C:
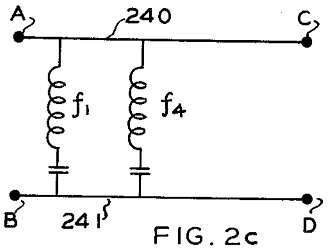
Figure 2D:
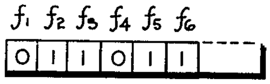
Figure 2E:
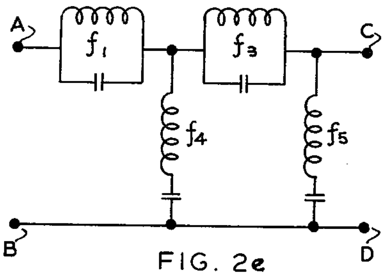
Figure 2F:
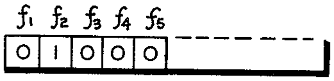
Figure 2G:
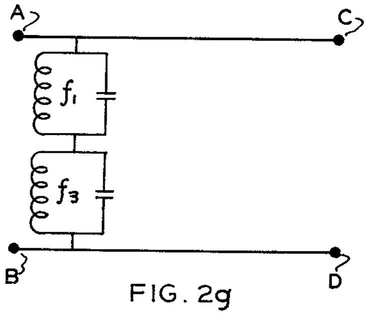
Figure 3:
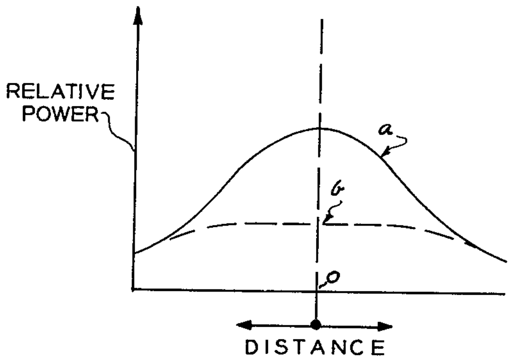
Figure 2H:
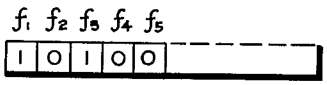

For a fuller understanding of the nature and objects of the invention reference should be had to the following detailed description taken in connection with the accompanying drawings, in which:

FIG. 1 is a schematic electrical block diagram illustrating one embodiment of the signalling system of this invention as it might be used in connection with a railroad data transmission system;

FIGS. 2*a*, 2*c*, 2*e* and 2*g* each are electrical schematic diagrams of several embodiments of coded passive responders which may be utilized with the signalling system of this invention;

FIGS. 2*b*, 2*d*, 2*f*, 2*h* are binary code diagrams of the several responder embodiments of FIGS. 2*a*, 2*c*, 2*e* and 2*g* and are included to aid in the explanation of the coding techniques utilized in the responders, and FIG. 3 is a graphical illustration useful in understanding the operation of the automatic gain control feature of this invention.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only and are not intended as a definition of the limits of my invention.

Referring now to the drawings, and particularly to FIG. 1 thereof, there is shown an embodiment of a complete signalling system in accordance with this invention comprising an interrogator 100 for providing a modulated interrogation carrier and for decoding a received modulated response carrier, a response block 102 for providing the modulated response carrier upon receipt of the modulated interrogation carrier, and a data link system 104 which may be utilized to transmit information obtained from decoding the modulated response carrier to some central information-gathering center. As will be obvious from the detailed description below, the data link system 104 is optional and is here included to illustrate a complete signalling system where data may be transmitted, if so desired, from an interrogator to a remotely located center.

The term carrier or carrier signal as used in this application is intended to mean any wave suitable for being modulated to transmit modulating signals. The term modulating signal as used in this specification is any wave suitable to modulate a carrier. It is also common practice in the art to refer loosely to the modulated and the modulating waves as radio-frequency and audio-frequency signals to distinguish between their relative frequencies. Such terminology has been adopted in the remainder of this specification, it being understood, however, that audio-frequency is used herein in its widest sense and does not confine the range of the modulating signals to the audible range.

The portion of the interrogator 100 which provides the uncoded interrogation carrier is also referred to as the interrogator transmit channel, and may include a plurality of audio frequency or modulating signal oscillators, only three of which are shown and respectively designated by reference characters 110, 111, and 112. Each audio frequency signal oscillator develops a signal of a different frequency as shown by the designations $f_1$, $f_2$ and $f_p$. As will become evident from the description below, the actual number $p$ of audio frequency oscillators utilized depends on the number of responders to be interrogated. Each of audio frequency signal oscillators 110, 111 and 112 may provide a sinusoidal output voltage to be referred to as an audio frequency interrogator signal or just interrogator signal. An audio-interrogator signal attenuator may be associated with each audio frequency oscillator. The plurality of attenuators are designated respectively by reference characters 114, 115 and 116. The individual interrogator signals appearing at the outputs of attenuators 114, 115 and 116 may be intermixed in a conventional audio signal mixer 117 to provide a composite audio interrogator signal which is modulated upon a radio frequency carrier such as may be generated by radio frequency oscillator 118 by modulation means such as a conventional modulator 119.

The output signal from modulator 119 comprises an audio-modulated carrier, which may be applied to a variable gain device such as attenuator 120, controlled by an automatic gain control signal (also referred to as an A.G.C. signal) appearing on lead 121. The purpose of providing automatic gain control and the method of developing the A.G.C. signal will be explained below in connection with FIG. 3.

The output signal from attenuator 120 may be suitably amplified, if desired, by an amplifying means such as power amplifier 122 and utilized to excite interrogator transmit coil 123 with the carrier modulated by the composite audio interrogator signal. Each of the individual components of the transmit channel are in themselves known to those skilled in the art and therefore need not be further elaborated on.

Attenuators 114, 115 and 116 provide individual interrogator signal amplitude control to compensate for frequency sensitive components in the signalling system, so that all interrogator signals ultimately received may have approximately the same signal strength. The combination of audio frequency signal oscillators 110, 111 and 112, attenuators 114, 115 and 116, mixer 117, modulator 119, radio frequency oscillator 118, gain device 120, amplifier means 122 and transmit coil 123 therefore provides an interrogator transmit means for generating and radiating a radio frequency carrier having a plurality of interrogator signals modulated thereon.

Responder pick-up coil 125 may be a tuned circuit resonant at the radio frequency of the carrier applied to interrogator transmit coil 123, and therefore coil 125, when tuned to the frequency of the interrogator carrier, will have a voltage induced in it by the interrogator carrier. In this manner responder pick-up coil 125 comprises a responder pick-up means or a tuned circuit means responsive to the carrier from the interrogator transmit means which is operative to develop a response signal. The response signal from the pick-up coil may be applied to a demodulator 126 which rectifies the received radio frequency carrier to derive a response-actuating signal having the composite interrogator signals modulated upon the rectified carrier voltage.

The response-actuating signal may be impressed upon a coding means such as coding network 127, which is operative in removing or suppressing certain ones of the plurality of interrogator signals making up the composite interrogator signal. As will be explained in considerable detail in connection with FIGS. 2*a* to 2*h*, coding network 127 may comprise a combination of audio frequency tuned circuits resonant at selected interrogator signal frequencies, which permit only selected ones of the interrogation signals to pass therethrough.

In other words, coding network 127 comprises a coding means responsive to the response-actuating signal which is operative to suppress predetermined ones of the audio interrogation signals and thereby provides a coded response-actuating signal including only those of the interrogator signals which are characteristic of the responder.

The coded response-actuating signal may then be utilized to power a response oscillator means, such as oscillator 128, having a tuned circuit resonant at a frequency different from that of radio frequency oscillator 118, for providing a radio frequency response carrier having the selected interrogation signals modulated thereon. The response carrier is impressed upon a responder transmit coil 129 which may comprise a suitable tuned circuit element for inducing the modulated response carrier into pick-up coil 130 when in close proximity to transmit coil 129. A more detailed description of responder 102 is offered in connection with FIG. 2 wherein responder transmit coil 129 comprises the tank circuit of the response oscillator 128.

The receive channel of the interrogator unit 100, provided with interrogator pick-up means, such as coil 130, is responsive to the electromagnetic energy coupled from the responder transmit coil 129 and operative to develop an interrogator receive signal. Such coils are well-known in the art and may comprise a parallel-resonant inductance-capacitance circuit. The bandwidth of the parallel-resonant circuit so comprised must be adequate to pass the side bands present in the energy coupled from coil 129; however this tuning can be made sharp enough to provide, in conjunction with filter 131, a desirable signal-to-noise ratio. To prevent any of the electromagnetic energy coupled from transmit coil 123 to pick-up coil 130 from entering the receive channel, filter 131 may be inserted between pick-up coil 130 and receiver 132. Filter 131 may be a band-pass filter centered about the response oscillator carrier frequency. For example, if the interrogator carrier frequency is 120 kilocycles per second and the response carrier frequency is 80 kilocycles per second, a band pass filter which passes a frequency band from 65 to 95 kilocycles per second would admirably serve the purpose.

Receiver 132 may include an amplifying stage and a demodulator to amplify and amplitude demodulate the modulated response carrier to derive therefrom a composite interrogator signal including the selected plurality of audio interrogator signals. Receiver 132 may also be utilized to derive a control signal shown appearing on lead 138 which may comprise the rectified component of the response carrier. The utilization of the control signal for A.G.C. purposes will be discussed in detail below in connection with the automatic gain control circuit. In this manner pick-up coil 130 and receiver 132 provide an interrogator receive means which is operative to receive the modulated response carrier from the responder and which is also operative to derive a control signal for automatic gain control and a composite audio frequency interrogator signal including the selected plurality of audio frequency interrogator signals.

The composite interrogator signal from the responder may then be unscrambled or separated into individual interrogator signals by a plurality of narrow band-pass audio frequency filters 134, 135 and 136. The plurality of filters as such is referred to herein as a discriminator means or simply as a discriminator. It is, of course, evident that for each audio frequency oscillator, such as 110, there must be a corresponding filter, such as 134, so that *p* filters are required altogether. The *f* designation shown for each filter indicates the center frequency of its pass band.

Each filter of the discriminator may be of a conventional design and may comprise either a parallel-tuned or series-tuned inductor-capacitor network. In certain instances it may be desirable to utilize an active filter of the well-known type comprised of a feed-back amplifier having a frequency dependent network in its feed back path. Suitable frequency dependent networks may be found in chapter 10 of "Vacuum Tube Amplifiers," vol. 18 of the Radiation Laboratory Series, published by McGraw-Hill Book Company, Inc., 1948. Each of the tuned circuits is resonant at a different one of the interrogator signals, and operative to pass only the interrogator signal at the resonant frequency of the tuned circuit. Each filter may include a rectifying stage having a diode to derive a direct current voltage as the coded output voltage.

Of course, if coding network 127 has suppressed a particular audio interrogator signal, this particular signal is not presented as part of the composite audio signal received by pick-up coil 130, and consequently, the filter associated with that particular suppressed audio frequency does not provide an output voltage. Thus it will be seen that the presence or absence of given audio frequencies in the signal received from any given responder may be indicated by a corresponding presence or absence of an output voltage from the filters associated with the given audio frequencies, providing a digital coding unique to the particular responder being interrogated.

Therefore, the plurality of filter 134, 135 and 136 provide an audio frequency discriminating and detecting means responsive to the composite audio frequency interrogator signal and operative to provide an output voltage signal for each audio frequency signal which has been transmitted to the responder, passed through the responder coding network and re-transmitted back to the interrogator receiver.

It should now be clear that the number of audio oscillators, such as the one designated by reference character 110, determines how many coding networks (and hence how many responders) can be uniquely identified. For example, if three interrogator signal oscillators are utilized, three different signals are modulated upon the interrogation carrier to provide only 8 different binary combinations. Therefore, only 8 different responders can be uniquely identified. With four interrogator signal oscillators, 16 response blocks may be identified. As is well known, if the number of response blocks to be identified is X, the number *p* of audio frequency interrogator signal oscillators necessary to provide unique identification is given by the expression $X \lesseqgtr 2^p$ where *p* is, of course, an integer. If 8000 response blocks are to be uniquely identified, 13 different interrogation signal oscillators are required. Of course, the required audio frequency interrogator oscillators may be divided between two or more interrogators placed side by side to provide a single composite interrogator.

The output voltages from the audio filters and detectors 134, 135 and 136 being in digital code, they may be applied directly to the digit stages 137, 138 and 139 of code register 140. Obviously, the number of stages required for the register is the same as the number of interrogator signal audio oscillators, each stage being associated with a different interrogator audio signal. Each stage of the register may be set by the ocuurrence of an output voltage from a particular filter, or, alternatively, each stage may be set by the absence of an output voltage, if desired.

It has been found that the reliability of the receive channel of interrogator 100 can be improved by applying the output voltages from detectors 134, 135 and 136 to the input circuits of a plurality of associated difference amplifiers 142, 143, and 144 instead of directly to register 140. In this manner, the output voltages may be compared with a reference voltage from a source 145 to make certain that the output voltages have a sufficient magnitude to have originated from an interrogation signal passed by coding network 127 instead of being noise or stray pick-up. Unless the magnitude of the output voltage from a given filter is above a predetermined level, indicating the presence of a sufficiently strong interrogation signal, its associated difference amplifier will provide no difference output voltage, and the digits of register 140 will not be set erroneously by noise or stray pick-up signals. Reference voltage source 145 may include an adjustment means, such as a potentiometer, to provide an adjustable reference voltage. The combination of the associated difference amplifiers 142, 143 and 144 and the reference voltage source 145 thereby provides a comparing means responsive to each of the output voltages from the detectors for comparing the output voltage with a reference voltage and for deriving a difference signal to be applied to register 140.

Attenuators 114, 115 and 116 may be utilized to individually control the amplitudes of the audio frequency interrogation signals so that the individual output voltages from the detectors 134, 135 and 136 may be set at a predetermined level with respect to the reference voltage. Some of the components placed between interrogator signal oscillators 110, 111 and 112 and filters 134, 135 and 136 of the discriminator are frequency sensitive and attenuate the interrogation signals as a function of their respective frequencies. Attenuators 114, 115 and 116 are primarily utilized to compensate for such frequency dependence and to provide an output voltage of predetermined magnitude regardless of frequency for comparison with the reference voltage from source 145.

Since interrogator 100 and responder 102 often move relative to each other, the coupling between interrogator transmit coil 123 and responder pick-up coil 125 increases, from a small value during the approach, to a maximum when the relative distance therebetween is a minimum, and thereafter decreases again as the two objects move apart in the opposite direction. If the energy provided by transmit coils 123 and 129 remains constant, the power level of the signal induced into pick-up coil 130 is depicted by curve "*a*," FIG. 3. Curve "*a*" is a plot of relative power level received by pick-up coil 130 versus distance between interrogator 100 and responder 102. By providing automatic gain control, the power applied to interrogator power amplifier 122 may be controlled so that the input to pick-up coil 130 remains nearly constant during the time interrogator 100 and responder 102 are in close proximity. Curve "*b*," FIG. 3, depicts the power induced into pick-up coil 130 when automatic gain control is provided.

The advantages attendant with automatic gain control should now become apparent. The receiver can be fully utilized without fear of saturation, which otherwise might clip or distort the received modulated response carrier. Furthermore, the output voltage from audio detectors 134, 135 and 136 remains constant during the time which corresponds to the flat portion of curve *b*, FIG. 3. In this manner, the reference voltage from source 145 may be set just a little below the level which corresponds to that flat portion, preventing any output voltages except during the time when automatic gain control is operative, and hence insuring that the register will not be set except during conditions of adequate signal strength.

Automatic gain control may be obtained from the rectified response carrier voltage on lead 138, which is commensurate with the power input to receiver 132. Since the voltage on lead 138 is amplitude-modulated with the composite interrogator signals passed by the coding network of the responder, audio filter 150 may be employed to eliminate this composite interrogator signal. Filter 150 may take the form of a simple R-C filter to suppress all interrogator signals, but should have a time constant which keeps the AGC loop gain less than unity beyond the 180° phase shift point, so that a stable loop is assured.

The output voltage from filter 150 may be impressed upon a difference amplifier 151 and compared with a selected reference voltage from an adjustable voltage source 152. If the reference voltage exceeds the output voltage from filter 150, no signal appears on lead 121, and variable gain device 120 inserts minimum attenuation between modulator 119 and amplifier 122. When the rectified and filtered response carrier voltage from filter 150 exceeds the reference voltage, a control signal is obtained which increases the attenuation of variable gain device 120, directly controlling the intensity of both the modulated carrier applied to interrogator transmit coil 123 and indirectly controlling the intensity of the modulated carrier applied to responder transmit coil 129. Variable gain device 120 may comprise a voltage-controlled variable gain amplifier rather than an attenuator, as will be apparent to those skilled in the art.

The combination of difference amplifier 151, filter 150 and source 152 thereby provide a further comparing means responsive to the rectified response carrier voltage for comparing the rectified response carrier with a reference voltage to derive an automatic gain control signal. As is easily seen, the level of the reference voltage determines the time of automatic gain control operation and therefore, the time of interrogation. The lower the reference voltage level, the longer will be the interval in which interrogator 100 and any given responder 102 will cooperate to provide signals to be recorded in code register 140.

As previously mentioned, the output voltages from difference amplifiers 142, 143 and 144 set register 140 by recording the selected interrogation signals passed by coding network 127 of the responder. It is therefore necessary that the register be "clear" prior to setting its digital stages. In other words, when interrogator 100 and responder 102 approach one another, no record of a previously recorded digital number should be in the register. For this purpose, an electrical clearing pulse is applied to each of the stages of register 140 via buss 160. This clearing pulse may be obtained from the output of a reset means such as monostable multivibrator 161 fired either by the AGC control signal on lead 121 or another control voltage derived from the response carrier. As shown, the difference signal from amplifier 151 may be utilized to fire monostable multivibrator 161 which clears code register 140 and thereby prepares it for receiving a new set of digits. The clearing of the code register 140 may take place when the automatic gain control becomes operative, which corresponds to the time at which interrogator 100 and responder 102 are coming into the desired proximity for identification. Multivibrator 161 therefore provides a code register clearing means, responsive to a voltage derived from the rectified response carrier signal and operative to provide a clearing pulse for resetting the code register.

In addition to clearing register 140, the pulse from the monostable multivibrator 161 may also be utilized to operate an analog audio frequency gate circuit 133 by opening the gate for the time interval during which the automatic gain control circuit is in operation. Gate 133 may comprise any one of a number of well-known networks which change their state of conduction during the receipt of a pulse of predetermined polarity and duration. Gate 133 will additionally improve reliability of the signalling system by opening the conduction path between receiver 132 and register 140 only during the time interval when interrogator 100 and responder 102 are in close proximity. In this manner, code register 140 is only open when the signal-to-noise ratio is a maximum.

In the interrogator described hereabove, difference amplifier 151 is utilized to provide automatic gain control and to fire multivibrator 161. It is to be understood, however, that such dual function arrangement has been presented only to retain simplicity and clarity in the description of this invention and that separate amplifiers or separate trigger signal sources may be employed. Likewise, the output signal from multivibrator 161 is suitable to simultaneously provide the clearing pulse to register 140 and the gating pulse to gate 133. As will be obvious to those skilled in the art, there may be certain advantages in utilizing separate multivibrators or perhaps other kinds of trigger circuits to provide the desired control signals.

The description of FIG. 1 hereinabove has been explanatory of one embodiment of the signalling system of this invention whereby a digital code is set into code register 140 when interrogator 100 and responder 102 pass each other. When interrogator 100 of this invention is mounted upon a railroad vehicle and responder 102 is fixed upon the tracks of the railroad network, the usefulness and versatility of the apparatus of this invention can be extended by providing a data link from moving interrogator 100 to some centrally located agency so that the agency may be apprised at all times of the location of the railroad vehicle.

Any one of many well-known data link systems may be employed for this purpose. The simplified data link system 104, illustrated in FIG. 1, is merely one exemplary way of transmitting the digital code set into code register 140 to a centrally located data link receiver 170. Each of the stages 137, 138 and 139 of code register 140 is connected to an associated coincidence or "and" circuit 171, 172 or 173. When a stage has a "one" set into it, a voltage representative of the "one" will appear on the lead connecting it to its associated coincidence circuit. When a "zero" is set into the stage, i.e. the stage has not been set, no voltage will appear on the lead to the associated coincidence circuit.

A free-running commutator or ring counter 175 providing a plurality of sequential output pulses has each of its output leads coupled to an input line of a different one of coincidence circuits 171, 172 and 173. The interconnection between commutator 175 and the plurality of coincidence circuits 171, 172 and 173 is made in such a manner that each of the coincidence circuits, having the same order as the interconnected stages, receive an output pulse in that sequence. Since a coincidence circuit provides an output voltage only if both of its input leads simultaneously receive input voltages, and since the output leads of all coincidence circuits are connected to an "or" circuit 176, the output of "or" circuit 176 will be a sequence of pulses for each of those stages 137, 138 and 139 into which a "one" is set. If all stages in code register 140 are set, the output of "or" circuit 176 takes the form of a number of equally spaced successive pulses. For each of the stages which are set with "zero," no pulse appears.

The output pulses from "or" circuit 176 may be utilized to modulate a data link carrier from radio frequency oscillator 177 with the aid of a modulator 178. Pulse modulation of a radio frequency carrier is well-known to those skilled in the art and therefore need not be elaborated upon. The pulsed or coded data link carrier from modulator 178 may be impressed upon the data link antenna 179 through the transmission actuator 180 for radiation of the coded intelligence to receiver 170. Transmission actuator 180 may comprise a gating network which is normally open, i.e., non-conductive and which becomes conductive when a control voltage is applied thereto. The control voltage applied to actuator 180 by lead 181 may be supplied by the synchronization unit 182 keyed by commutator 175. The purpose of synchronization unit 182 is to provide a means of identifying the start of a sequence, i.e., to start transmission of the radio frequency carrier when commutator 175 applies a pulse to the "and" circuit associated with the first stage of code register 140. There are, of course, many other ways well known to those skilled in the art of providing intelligence to mark the beginning of the commutation sequence, which may be substituted for the exemplary system described.

It is sometimes desirable to restrict transmission of data link information to a short time interval commencing when code register 140 has been set. This may be accomplished by a further control signal applied via lead 184 to transmission actuator 180. The further control signal may be taken directly from monostable multivibrator 161 which, as explained above, may provide a pulse of any desired duration when fired. A delay network, not shown, may be incorporated into actuator 180 in connection with input lead 184 to start transmission at a time when all digits have been set into code register 140.

If it is desired to receive coded information from more than one interrogator with the same data link antenna 185 and data link receiver 170, an identification register 190 may be added to code register 140 to provide a binary number characteristic of a particular interrogator. The number of digits in identification register 190 depends on the number of interrogators to be employed. For example, if 50 interrogators are to be in service, the minimum number of binary digits necessary for identification system 190 would be six, as is well known. Each digit of identification register 190 is connected to an associated coincidence or "and" circuit 191 in the same way as described in connection with the binary digits of code register 140. Only one "and" circuit 191 has been shown to retain simplicity of the block diagram of FIG. 1, but it will be obvious to those skilled in the art, that each binary digit requires its own associated "and" circuit. Similarly, each "and" circuit has its input lead coupled to commutator 175 for becoming part of the sequential coding in the same manner as "and" circuits 171, 172 and 173. Whether the control signal on lead 181 starts the sequence with the stages of code register 140 or identification register 190 is purely a matter of choice.

As described above, responder 102 of FIG. 1 receives a radio frequency carrier having a composite interrogator signal modulated thereon. This composite signal is a mixture of all the interrogation signals derived from the plurality of audio frequency oscillator 110, 111 and 112. Responder 102 utilizes this received carrier to provide a radio frequency response carrier having a further composite interrogator signal modulated thereon. The further composite interrogator signal is a mixture of those of the interrogation signals which are passed by the coding network of a particular responder. In other words, the responder is a means responsive to a radio frequency interrogator carrier having a plurality of audio frequency interrogator signals modulated thereon which is operable to derive a radio frequency response carrier having only selected ones of said plurality of audio frequency interrogators modulated thereon.

Referring now to FIG. 2*a*, there is shown one illustrative embodiment of a responder constructed in accordance with this invention. A tuned circuit 210, comprising an inductor 211 and a capacitor 212, may, if desired, be utilized as responder pick-up coil 125, FIG. 1. The impedance values of the inductor 211 and capacitor 212 are selected that circuit 210 is resonant at the frequency of the interrogator carrier. Of course, if the transfer of energy is primarily by radiation, a radio frequency antenna may be coupled to tuned circuit 210. In this manner, tuned circuit 210 or a combination of a tuned circuit and an antenna provides a responder pick-up means for receiving the modulated interrogator carrier.

A rectifier, such as diode 213, rectifies the modulated radio frequency interrogator carrier and a smoothing capacitor 214 provides carrier filtering or smoothing action. It is, of couse, necessary to select the impedance of capacitor 214 so that only the interrogator carrier is smoothed and so that none of the audio interrogator modulating signals are appreciably attenuated. It is, of course, obvious that smoothing capacitor 214 may be replaced by any of the many well-known filters which, in conjunction with rectifier 213, provides a demodulated RF voltage. The combination of diode 213 and capacitor 214 corresponds to amplitude demodulator 126 of FIG. 1. The signal appearing across terminals A and B, which signal has been referred to as the response-actuating signal, is made up of a rectified interrogator carrier component and the composite audio interrogator signal including all of the audio frequencies ($f_1$, $f_2$, . . . $f_p$) modulated on the carrier transmitted to the responder from the interrogator transmit channel. The combination of rectifier 213 and capacitor 214 therefore provides a responder demodulation means responsive to the modulated interrogator carrier signal which is operative to amplitude-demodulate the carrier signal to derive a response-actuating signal.

Coupled across terminals A and B is a coding network 220 which corresponds to coding network 127 shown in FIG. 1. Coding network 220 comprises a selected number of tuned circuits, resonant at those of the interrogation signal frequencies which are to be suppressed. Each of the tuned circuits is designated by a reference character $f_3$, $f_5$, $f_7$, $f_8$ and $f_9$ to designate its respective resonance frequency and may comprise a parallel-resonant inductance-capacitance network. Tuned circuit $f_3$ is resonant at the interrogator signal having the audio frequency $f_3$. At resonance this circuit presents substantially infinite impedance, which prevents interrogator signal $f_3$ from appearing across coding network output terminals C and D. Similarly, the interrogator signals $f_5$, $f_7$, $f_8$ and $f_9$ are likewise prevented by tuned circuits $f_5$, $f_7$, $f_8$ and $f_9$ respectively from appearing across terminals C and D.

For effective operation of the coding network, the individual tuned circuits should have a high Q so that none but predetermined interrogation signals are attenuated. The greater the desired number of digits in the digital code, the greater will be the number of audio interrogator signals required and the smaller will be the allowable frequency separation between two frequency adjacent signals, since the available audio frequency band is limited. Consequently, the Q's of the tuned circuits $f_3$, $f_5$, $f_7$, $f_8$ and $f_9$ determine, at least to some extent, the number of digits which may be employed. The audio frequency band or spectrum available depends on the low frequency end, and on the availability of a tuned circuit such as circuit $f_3$ which can be made resonant at frequency $f_3$. For all practical purposes, frequencies below 500 cycles per second should be avoided. On the high frequency end, the limit is imposed by condenser 214 which smoothes out the interrogation carrier. For example, if the interrogator carrier frequency is 120 kilocycles per second, interrogator signals above approximately 30 kilocycles should be avoided to prevent rectification thhereof. A typical selection of 10 interrogator frequencies, none of which is harmonically related to the others, in kilocycles per second is as follows: 2.1, 2.5, 3.1, 3.7, 4.3, 5.5, 6.6, 7.7, 8.8, 9.6.

Coding network 220, as described above, is therefore seen to be a coding means responsive to the response-actuating signal for suppressing predetermined ones of the plurality of audio frequency interrogator signals which is operative to provide a coded response-actuating signal of a selected plurality of the audio frequency interrogator signals identifying the responder uniquely.

The signal appearing across terminals C and D and heretofore referred to as a coded response-actuating signal may be utilized to power a response oscillator 230, which may include a parallel-tuned circuit comprising inductor 231 and capacitor 232. The impedance values of inductor 231 and capacitor 232 are selected to provide resonance at the desired frequency of the radio frequency response carrier. The collector electrode of NPN junction transistor 233 is connected to one side and terminal C to the other side of the parallel tuned circuit of oscillator 230. A parallel combination of resistor 234 and capacitor 235 is connected between the base electrode of the transistor 233 and one output terminal of inductor 236. The remaining output terminal is connected to terminal C. Terminal D is coupled to the emitter electrode of the transistor 233. The circuit hereabove described is a transistorized version of a conventional tuned plate type oscillator and is merely exemplary. The coded response-actuating signal, appearing between terminals C and D, comprises a direct-current component due to carrier rectification together with those audio components of the original carrier which were not filtered out by the tuned circuits of coding network 220. This composite signal is applied, as shown, both to furnish power to transistor oscillator 230 and to modulate the carrier provided by oscillator 230. The composite signal is applied through the oscillator tank circuit (coil 231 and capacitance 232) directly across the transistor collector-emitter circuit, causing transistor current flow. The current variations in coil 231 of the tank circuit are coupled to inductor 236, which is connected via an RC network (234, 235) to the transistor base electrode, thereby providing the positive feedback necessary to sustain oscillation. The circuit therefore oscillates and provides a second carrier at the resonant frequency of tank circuit 231, 232. Inasmuch as the current flowing through resistor 234 controls the transistor and tank circuit and already contains the audio components, the carrier generated by oscillator 230 will be modulated by these audio components. Resistor 234 serves to bias the base electrode properly with respect to the emitter, and capacitor 235 serves as an RF bypass around resistor 234. Numerous different oscillators may be substituted therefor, as for example, those shown in chapter 14 of "Handbook of Semiconductor Electronics," Hunter, 1st edition, 1956, McGraw-Hill, New York.

It has been pointed out above that the coded response-actuating signal may be the sole power input signal to response oscillator 230. Because the coded response-actuating signal comprises a component due to the rectified radio frequency interrogator carrier and another component due to the selectively passed audio frequency interrogater signals, the radio frequency response carrier is modulated with a composite interrogator signal comprising only such selectively passed interrogator signals. If, in a particular responder, none of the audio frequency interrogator signals is transmitted by the coding means and, instead, all audio frequencies are to be suppressed to identify the responder by the digital code 0000 . . . 000, the oscillator 230 is still required to provide a radio frequency response carrier. The rectified interrogator carrier component must always be sufficiently large to set oscillator 230 into oscillations. Also, the degree of modulation or the modulation factor must not be so large as to interfere with the powering of oscillator 230.

The tuned circuit comprising inductor 231 and capacitor 232 may be utilized as responder transmit coil 129, FIG. 1, so that no auxiliary transmit coil is required. Of course, an antenna may be coupled to this tuned circuit to provide the actual radiating element if so desired. As only a radio frequency carrier of a single frequency (namely the modulated response carrier) is applied to tuned circuit 231, transmit coil 129, FIG. 1, may be tuned relatively sharply to provide high gain and a resulting saving in power. For the same reason transmit coil 123 and pick-up coils 125 and 130, FIG. 1, may be relatively sharply tuned.

The combination of oscillator 230, including the tuned circuit comprising inductor 231 and capacitor 232, provides therefor, a responder oscillator means responsive to the coded response actuating signals which is operative to generate and radiate a radio frequency response carrier having selectively passed interrogator signals modulated thereon, the particular combination of interrogator signals modulated on the response carrier being uniquely related to the particular responder containing the oscillator means.

FIG. 2*b* illustrates the digital code which the responder of FIG. 2*a* would set on code register 140, FIG. 1. The tuned circuits $f_3$, $f_5$, $f_7$, $f_8$ and $f_9$ permit transmission of the interrogator signals having frequencies $f_1$, $f_2$, $f_4$, $f_6$ through coding network 220. Therefore, selected interrogation signals $f_1$, $f_2$, $f_4$, $f_6$ . . . provide the "ones" at the output leads of associated difference amplifiers, such as those shown in FIG. 1 and designated by reference numerals 142, 143 and 144. As previously mentioned, each responder is provided with a different coding network having a different number or kind or both of audio tuned resonance circuits to provide a coded response-actuating signal having a unique combination of audio frequencies.

FIGS. 2*c*, 2*e* and 2*g* show different embodiments of coding networks constructed in accordance with this invention which may be substituted for coding network 220, FIG. 2*a*. The terminal designation A, B, C, and D of FIG. 2*a* is retained to designate the connecting terminals of the various coding means. The coding means shown in FIG. 2*c* utilizes two series-tuned inductive-capacitance circuits $f_1$ and $f_4$ resonant respectively at the audio frequencies $f_1$ and $f_4$. If a response-actuating signal is impressed upon terminals A and B, the resulting coded response-actuating signal will not include audio frequency interrogator signals $f_1$ and $f_4$ since at those frequencies the tuned circuits $f_1$ and $f_4$ are resonant and effectively establish a short circuit across the conductors 240 and 241. FIG. 2*d* graphically illustrates the digital code of the coding network of FIG. 2*c* from which interrogator signals $f_1$ and $f_4$ are eliminated or suspended.

The coding network illustrated in FIG. 2*e* utilizes a combination comprising two parallel-tuned inductance-capacitance circuits $f_1$ and $f_3$ serially inserted between terminals A and C, and two series-tuned inductance-capacitance circuits $f_4$ and $f_5$ shunted across terminals A and B. The parallel-tuned circuits, resonant at the frequencies $f_1$ and $f_3$, will suppress the passage of interrogation signals having frequencies $f_1$ and $f_3$. The series-tuned circuits, resonant at the frequencies $f_4$ and $f_5$, will suppress interrogation signals having frequency $f_4$ and $f_5$. FIG. 2*f* illustrates the digital code of the coding network illustrated in FIG. 2*e*. The only interrogator signals appearing across terminals C and D are interrogator signal having frequency $f_2$ and of course those having a frequency higher than $f_5$.

FIG. 2*g* illustrates a coding network utilizing two parallel-tuned inductance-capacitance circuits $f_1$ and $f_3$ respectively tuned to the frequencies $f_1$ and $f_3$ of the interrogation signals to be transmitted and connected in series across terminals A and B. Instead of utilizing a tuned circuit for eliminating a particular interrogation signal, the tuned circuits in this embodiment pass selected interrogation signals. All interrogator signals appearing between A and B except those having frequencies $f_1$ and $f_3$ will be effectively short circuited across the conductors respectively connecting terminals AC and BD. FIG. 4*h* illustrates the binary code of coding network illustrated in FIG. 2*g*.

There has been described a signalling system wherein an interrogator in relative motion with a plurality of responders identifies each responder by a digital code. The identification is accomplished by interrogating each response block at the time of closest approach with a plurality of audio frequency signals modulated upon an interrogation carrier having a single frequency. Upon receiving the interrogation carrier, any given responder provides a response carrier having a unique combination of the audio frequency interrogation signals modulated thereon. The interrogator picks up the response carrier, and by sensing which audio frequencies are present on and which are absent from the response carrier, a digital representation identifying the responder from which the response carrier is being received is produced.

While the specific embodiment disclosed above illustrates a system in which the carrier information frequencies are amplitude-modulated by the audio code or digit frequencies, it will be apparent to those skilled in the art as a result of this disclosure that phase or frequency modulation may be substituted in parts of the system without departing from the invention.

A number of known circuits are available in the prior art to provide the elements shown in block form in the drawings, and my abovementioned copending application discloses a number of exemplary circuits which may be used.

What I claim as my invention and desire to secure by Letters Patent is:

1. A passive responder unit capable of relative movement with respect to an interrogator apparatus and operable to provide a response signal having a coded characteristic, said unit comprising in combination: first means for receiving a first carrier signal emitted from said interrogator apparatus, said first carrier signal having a plurality of fixed discrete signals of different frequencies modulated thereon; second means coupled to said first means; and response-signal generating third means connected to said second means and operable to provide a response carrier signal, said second means being operative to selectively eliminate or pass selected ones of said discrete signals to said third means and operative to demodulate said first carrier signal to provide the operating power for said third means.

2. A responder unit in accordance with the structure of claim 1 wherein said first means includes a parallel-tuned inductance-capacitance circuit resonant at the frequency of said first carrier.

3. A responder according to claim 2 in which said second means includes a demodulator connected to said tuned circuit for demodulating said first carrier signal to provide a response-actuating signal comprising the rectified component of said first carrier signal modulated with said plurality of discrete signals.

4. A responder unit according to claim 1 wherein said second means comprises a number of tuned circuits each of which is resonant at a different one of the frequencies of the said selected modulating signals.

5. A responder unit according to claim 1 wherein said second means comprises a number of tuned circuits each of which is resonant at a different one of the frequencies of the non-selected modulating signals.

6. A responder unit according to claim 4 wherein said tuned circuits are connected in series with one another and wherein each of said tuned circuits comprises a parallel-tuned inductance-capacitance network.

7. A responder unit according to claim 5 wherein said tuned circuits are connected in parallel with one another and wherein each of said tuned circuits comprises a series-tuned inductance-capacitance network.

8. A responder unit according to claim 5 wherein each of said tuned circuits are connected in series with one another and wherein each of said tuned circuits comprises a parallel-tuned inductance-capacitance network.

9. A responder unit according to claim 5 wherein some of said tuned circuits are connected in series with one another and wherein the remaining of said tuned circuits are connected in parallel with one another and wherein said series-connected tuned circuits comprise parallel-tuned inductance-capacitance networks and wherein said parallel-connected tuned circuits comprise a series-tuned inductance-capacitance network.

10. A coded responder unit comprising: a first tuned circuit means for receiving a first radio frequency carrier corresponding to its resonance frequency having a plurality of fixed discrete audio frequency signals modulated thereon, said first tuned circuit means including carrier demodulation means to provide a response-actuating signal including audio-frequency components in accordance with said audio-frequency signals; coding means coupled to said first tuned circuit means for suppressing selected ones of said audio-frequency signals from said response-actuating signal; and a second tuned circuit means coupled to said coding means and responsive to the response-actuating signal as modified by said coding means for generating a second radio frequency carrier having a frequency different from that of said first carrier and being modulated by the non-suppressed audio frequency signals.

11. A coded responder unit comprising: a tuned circuit means including a parallel-resonant inductance-capacitance pick-up coil for receiving a first radio frequency carrier corresponding to the resonance-frequency of said pick-up coil, said first carrier having a plurality of audio frequency interrogator signals modulated thereon, said tuned circuit means providing an amplitude demodulated response-actuating signal having audio frequency components in accordance with said interrogator signals; coding means coupled to said circuit means for transmitting only selected ones of said audio frequency interrogator signals of said response actuating signal and providing thereby a coded response-actuating signal; and oscillator means coupled to said coding means and solely powered by said coded response-actuating signal for generating a second radio frequency carrier having a frequency different from that of said first carrier and being modulated by the interrogator signals transmitted by said coding means.

12. Apparatus according to claim 10 in which said first tuned circuit means includes a resonant pick-up coil inductance and a capacitance; in which said response-actuating signal also contains a direct component; and in which said second tuned circuit means includes an oscillator means for providing said second radio frequency carrier, said coded response-actuating signal being connected to said oscillator means, whereby said second carrier is modulated by the audio components of said coded response-actuating signal.

13. Apparatus according to claim 10 in which solely said coded response-actuating signal provides power to said second tuned circuit means.

14. A coded responder unit comprising: a parallel-resonant inductance-capacitance pick-up coil excitable with a first radio frequency carrier having a frequency in accordance with the resonance frequency of said pick-up coil and being modulated with a plurality of interrogator signals; carrier demodulator means coupled across said pick-up coil to provide a response-actuating signal having a direct voltage component commensurate with the magnitude of said first carrier and alternating voltage components commensurate with the frequencies of said plurality of said interrogator signals; coding means coupled to said demodulation means for transmitting said direct voltage component and selected ones of said alternating voltage components therethrough and providing thereby a coded response-actuating signal; and oscillator means coupled to said coding means and responsive to said coded response-actuating signal for generating a second radio frequency carrier having a frequency different from that of said first carrier and being modulated by those of the interrogator signals whose frequencies are commensurate with said selected ones of said alternating voltage components.

15. A passive responder unit adapted to be excited by a first radio frequency carrier having a plurality of audio frequency interrogator signals modulated thereon and for generating a second radio frequency carrier having only selected ones of said plurality of audio frequency interrogator signals modulated thereon, said responder unit comprising: a parallel-resonant inductance-capacitance tuned circuit having a resonance frequency corresponding to said first carrier; a rectifier connected in series with said tuned circuit; a radio frequency smoothing capacitor connected in parallel across the series combination of said tuned circuit and said rectifier, the combination of said tuned circuit, said rectifier and said capacitor being operative to provide a response-actuating signal having a rectified carrier component and audio components corresponding to said audio frequency interrogator signals; a coding means including a plurality of audio frequency tuned circuits responsive to said response-actuating signal, said coding means being operative to suppress particular ones of said audio frequency interrogator signals and operative to pass others of said audio frequency interrogator signals, thereby to provide a coded response-actuating signal having audio frequency components in accordance with said others of said audio frequency interrogator signals; and oscillator means responsive to said coded response-actuating signal and operative to generate said second carrier, said oscillator means including a parallel-resonant inductance-capacitance transmit coil, a transistor having a collector, an emitter and a base electrode, a parallel resistance-capacitance network coupled to said base electrode, an inductance inter-coupling one end of said transmit coil with said network, said collector electrode being connected to the other side of said transmit coil, said coded response-actuating signal being applied to said emitter electrode and one end of said transmit coil.

16. A passive responder unit adapted to be excited by a first radio frequency carrier having a plurality of interrogator signals modulated thereon and for generating a second radio frequency carrier having only certain ones of said plurality of interrogator signals modulated thereon, said responder unit comprising: a tuned circuit having a resonance frequency corresponding to said first carrier; detector means coupled to said tuned circuit for providing a response-actuating signal having a rectified carrier component and a plurality of alternating current components corresponding to said interrogator signals; coding means including tuned circuits responsive to said response-actuating signal for transmitting only selected ones of said plurality of interrogator signals therethrough and operative to suppress others of said interrogator signals, thereby to provide a coded response-actuating signal having alternating current components in accordance with said selected ones of said interrogator signals; and oscillator means responsive to said coded response actuating signal and operative to generate said second carrier, said coded response-actuating signal providing the sole power to said oscillator means.

17. A signalling system for identifying passive coded responders with an interrogator, said signalling system comprising: interrogator transmit means for producing a first radio frequency carrier having a plurality of audio frequency interrogator signals modulated thereon; at least one responder, said responder including pick-up means excitable by said first carrier, the electromagnetic coupling between said interrogator transmit means and said responder pick-up means being a maximum when the distance therebetween is a minimum; responder demodulation means coupled to said responder pick-up means and operative to demodulate said first carrier and to provide a response-actuating signal having a rectified first carrier component and audio components corresponding to said audio frequency interrogator signals; responder coding means coupled to said responder demodulation means operative to transmit said rectified first carrier component and selected ones of said audio components and thereby to provide a digitally coded response-actuating signal having said rectified first carrier component modulated with said selected audio components which identify said responder uniquely, each responder transmitting a different selection of audio components; responder oscillating means coupled to said coding means for generating a second radio frequency carrier having said selected audio components modulated thereon, said digitally coded response-actuating signal furnishing the sole power to said oscillating means; interrogator pick-up means excitable by said modulated second carrier; interrogator demodulation means coupled to said interrogator pick-up means and operative to demodulate said second carrier and to provide a second rectified carrier component and audio components corresponding to said selected audio frequency interrogator signals; interrogator signal discriminating means having a plurality of channels coupled to said interrogator demodulation means, each one of said channels being selectively responsive to a different one of said audio components and being operative to provide an output voltage for each of the audio components modulated on said second carrier; and a plural stage register means responsive to said output voltages, each of said channels being coupled to a different stage of said register to provide an indication of the presence or absence of said output voltages.

18. A signalling system in accordance with claim 17 including a data link transmission system having a data link transmitter responsive to said output voltages and operative to sequentially sample each of said register stages and encode a third radio frequency carrier in accordance with the state of said stages, said transmission system also including a data link receiver means responsive to said third carrier and operative to decode said third carrier to derive an indication of the state of each of said stages.

19. A railroad signalling system for sequentially identifying a plurality of adjacent passive coded responders located upon the tracks of a railroad network by means of an interrogator located upon a railroad vehicle, each responder being identified when said railroad vehicle is approximately at a selected minimum distance therefrom, said signalling system comprising: an interrogator including a transmit means for generating a first radio frequency carrier modulated with a plurality of audio frequency interrogator signals, a receive means for receiving and demodulating a second radio frequency carrier modulated with a selected combination of said audio frequency interrogator signals, an audio frequency discriminating means coupled to said receive means and operative to provide a separate output voltage for each interrogator signal included within said selected combination, and a multi-stage register, each stage being associated with and responsive to a different one of said output voltages for providing an indication of said interrogator signals included within said selected combination; and a plurality of responders, each responder including a pick-up means for receiving and demodulating said modulated first carrier to provide a response-actuator signal having a rectified carrier component and audio components in accordance with said plurality of interrogator signals, a coding means coupled to said pick-up means transmitting said rectified carrier component and audio components corresponding to a selected combination of said interrogator signals therethrough, each responder including a coding means transmitting a different selected combination of audio components, and oscillator means coupled to said coding means and powered by said transmitted rectified carrier component and operative to provide said second carrier, said transmitted audio components being operative to modulate said second carrier with said selected combination of interrogator signals.

20. A signalling system for identifying passive coded responders with an interrogator, said system comprising: interrogator transmit means for providing a first radio frequency carrier having a plurality of audio frequency interrogator signals modulated thereon; at least one passive responder responsive to said first radio frequency carrier and operative to provide, in response thereto a second radio frequency carrier having only selected ones of said plurality of interrogator signals modulated thereon; interrogator pick-up means associated with said interrogator transmit means and excitable by said modulated second carrier; interrogator demodulation means coupled to said interrogator pick-up means and operative to demodulate said second carrier and to provide a rectified carrier component and audio components corresponding to the frequencies of said selected interrogator signals; audio frequency discriminating and detecting means including a plurality of frequency sensitive channels each tuned to a different one of said interrogator signals, each one of said channels being selectively responsive to a different one of said audio components and operative to provide an output voltage upon application of an audio component to which it is tuned; and plural stage register means, each stage being set by a different one of said output voltages to provide an indication of said selected interrogator signals.

21. A signalling system for identifying passive coded responders by means of an interrogator and comprising: interrogator transmit means including automatic gain control means responsive to a control voltage for providing an amplitude-controlled first radio frequency carrier having a plurality of audio frequency interrogator signals modulated thereon; at least one passive responder excitable by said first carrier and operative to provide, in response thereto, a second radio frequency carrier having only selected ones of said plurality of interrogator signals modulated thereon, said interrogator transmit means and said responder being capable of relative motion in respect to one another so as to vary the degree of electromagnetic coupling therebetween; interrogator pick-up means for receiving said modulated second carrier; interrogator demodulation means coupled to said interrogator pick-up means and operative to demodulate said second carrier to derive said control voltage commensurate with the rectified carrier component of said second carrier and audio components corresponding to said selected interrogator signals; interrogator signal discriminating and detecting means having a plurality of frequency sensitive channels each selectively responsive to a different one of said audio components and operative to provide an output voltage upon application of an audio component of its individual frequency.

22. A signalling system in accordance with claim 21 having a gating means interposed between said interrogator demodulation means and said interrogator signal discriminating means, said gating means being responsive to a gate control signal and being operative to transmit said audio components to said signal discriminating means upon the occurrence of said gate control signal, and gate control signal means responsive to said rectified carrier component of said second carrier and operative to provide said gate control signal when said rectified carrier component reaches a predetermined magnitude.

23. A signalling system in accordance with claim 21 wherein said interrogator transmit means includes a control voltage comparing means responsive to said rectified carrier component of said second carrier for comparing the magnitude of said rectified carrier component with a reference voltage to derive said control voltage.

24. A signalling system in accordance with claim 21 wherein said interrogator includes a multi-stage register means, each stage of said register being associated with a different one of said audio components and being responsive to a coding voltage difference signal, and a plurality of comparing means, each comparing means being responsive to a different coding voltage for comparing the magnitude of said coding voltage with a further reference voltage and being operative to derive said coding voltage difference signal.

25. A signalling system in accordance with claim 24 wherein each stage of said multi-stage register means is responsive to a reset pulse for clearing said register, and reset pulse means responsive to said rectified carrier component of said second carrier and providing said reset pulse when said rectified carrier component suffers a predetermined change of magnitude.

26. An interrogator-responder system comprising: interrogator transmit means including automatic gain control means responsive to an automatic gain control difference voltage for controlling the amplitude of electromagnetic radiation in the form of a first radio frequency carrier having a plurality of interrogator signals modulated thereon; a passive responder responsive to said first carrier and operable to provide response electromagnetic radiation in the form of a second radio frequency carrier having only selected ones of said plurality of interrogator signals modulated thereon, said interrogator transmit means and said responder being capable of relative movement so as to vary the length and attenuation of the path of said electromagnetic radiation between said interrogator transmit means and said responder; a receive means associated with said interrogator and operative to receive said response electromagnetic radiation from said responder and to derive a rectified response carrier voltage and a composite interrogator response signal including said selected interrogator signals; interrogator signal discriminator means having a different output terminal associated with each one of said plurality of interrogator signals for unscrambling said composite interrogator response signal, said discriminator means being responsive to said composite interrogator response signal and operative to provide response output signals on those of said output terminals which are associated with said selected interrogator signals; a plurality of detector means each responsive to a different one of said response output signals and operative to derive response output voltages indicative of said selected interrogator signals received by said receive means; and comparing means responsive to said rectified response carrier voltage for comparing said rectified response carrier voltage with a reference voltage and operative to provide said automatic gain control difference voltage

References Cited in the file of this patent

UNITED STATES PATENTS

| | | |
|---|---|---|
| 2,000,130 | Espenschied et al. | May 7, 1935 |
| 2,369,662 | Deloraine | Feb. 20, 1945 |
| 2,542,803 | Evans | Feb. 20, 1951 |
| 2,607,004 | Harris | Aug. 12, 1952 |
| 2,664,554 | Doremus | Dec. 29, 1953 |
| 2,679,043 | Lipkin | May 18, 1954 |
| 2,818,732 | Bennett | Jan. 7, 1958 |
| 2,841,700 | Hallden | July 1, 1958 |
| 2,851,592 | Webster | Sept. 9, 1958 |
| 3,018,475 | Kleist et al. | Jan. 23, 1962 |